United States Patent
Henderson

(10) Patent No.: US 11,247,787 B1
(45) Date of Patent: Feb. 15, 2022

(54) AIRCRAFT ENGINE STORAGE FRAME AND SYSTEM

(71) Applicant: Jeffrey L. Henderson, Tolleson, AZ (US)

(72) Inventor: Jeffrey L. Henderson, Tolleson, AZ (US)

(73) Assignee: NextGen Aero Support, LLC, Tolleson, AZ (US)

( * ) Notice: Subject to any disclaimer, the term of this patent is extended or adjusted under 35 U.S.C. 154(b) by 0 days.

(21) Appl. No.: 17/380,358

(22) Filed: Jul. 20, 2021

(51) Int. Cl.
*B64F 5/50* (2017.01)
*F02C 7/20* (2006.01)
*F01D 25/28* (2006.01)

(52) U.S. Cl.
CPC .............. *B64F 5/50* (2017.01); *F01D 25/285* (2013.01); *F02C 7/20* (2013.01)

(58) Field of Classification Search
CPC . B23P 19/045; B23P 21/00; F01L 3/24; F01L 3/10; F01L 2303/01
See application file for complete search history.

(56) References Cited

U.S. PATENT DOCUMENTS

| | | | |
|---|---|---|---|
| 2,825,447 A | 3/1958 | Ross | |
| 3,268,093 A | 8/1966 | Keiter | |
| 3,313,081 A * | 4/1967 | Squire | E04G 11/48 52/645 |
| 4,412,774 A | 11/1983 | Legrand | |
| 4,660,796 A | 4/1987 | Garrec | |
| 4,699,337 A | 10/1987 | Lewis | |
| 4,781,517 A * | 11/1988 | Pearce | B23P 19/04 104/167 |
| 4,940,382 A * | 7/1990 | Castelain | B62D 57/00 114/222 |
| 5,180,070 A * | 1/1993 | Feider | B62D 7/026 180/415 |
| 5,320,475 A | 6/1994 | Pinder | |
| 5,383,652 A * | 1/1995 | Van Den Berg | B25H 1/0007 269/17 |
| 5,407,415 A * | 4/1995 | Spishak | G05B 19/423 483/4 |
| 5,653,351 A * | 8/1997 | Grout | B66C 19/005 212/315 |
| 5,722,512 A | 3/1998 | Lilja et al. | |
| 5,816,367 A | 10/1998 | Lilja | |
| 6,000,903 A | 12/1999 | Hatch et al. | |
| 6,170,141 B1 | 1/2001 | Rossway et al. | |
| 6,292,999 B1 | 9/2001 | Rossway et al. | |
| 6,298,536 B1 | 10/2001 | Rossway et al. | |
| 7,677,582 B2 | 3/2010 | Hedley | |

(Continued)

FOREIGN PATENT DOCUMENTS

DE 60203589 T2 5/2005
EP 0066548 12/1982

*Primary Examiner* — Lawrence Averick
(74) *Attorney, Agent, or Firm* — Mark V. Loen

(57) ABSTRACT

The embodied invention is a storage frame that supports an aircraft engine with flexible engine mounting and is easily assembled by bolts. It includes feet to anchor the frame to the ground. It has adjustable height legs and is attachable to a variety of engine mount positions. It includes a central lifting tube with lifting connections that allow the frame to be lifted by an overhead crane or forklift. The adjustable legs provide convenience in transferring the engine onto a shipping support stand.

10 Claims, 6 Drawing Sheets

(56) References Cited

U.S. PATENT DOCUMENTS

| | | | |
|---|---|---|---|
| 7,770,292 B2* | 8/2010 | Stretton | B66C 1/10 29/889.1 |
| 7,946,554 B2 | 5/2011 | Sassatelli | |
| 8,057,140 B2 | 11/2011 | Entwistle | |
| 8,418,340 B2* | 4/2013 | Koehnen | B25B 5/147 29/428 |
| 8,833,776 B2 | 9/2014 | Boulanger | |
| 8,910,374 B2* | 12/2014 | Davi | F01D 25/285 29/705 |
| 9,249,733 B2 | 2/2016 | Hallam | |
| 9,309,008 B2* | 4/2016 | Boulanger | B66F 9/06 |
| 9,708,079 B2* | 7/2017 | DesJardien | B25J 9/0018 |
| 9,969,525 B2* | 5/2018 | Longaphie | E02F 3/80 |
| 10,040,579 B1 | 8/2018 | Henderson | |
| 2008/0135546 A1 | 6/2008 | Smith et al. | |
| 2009/0266275 A1 | 10/2009 | Feeney | |
| 2009/0294625 A1 | 12/2009 | Fernley | |
| 2011/0214586 A1* | 9/2011 | Wessel | B60V 3/02 104/23.2 |
| 2011/0272553 A1 | 11/2011 | Alexander et al. | |
| 2012/0110816 A1 | 5/2012 | Groves | |
| 2012/0228839 A1 | 9/2012 | Boulanger et al. | |
| 2015/0316197 A1 | 11/2015 | Morey | |

* cited by examiner

AIRCRAFT ENGINE STORAGE FRAME AND SYSTEM

CROSS REFERENCE TO RELATED APPLICATIONS

Not applicable

STATEMENT OF FEDERALLY SPONSORED RESEARCH OR DEVELOPMENT

Not applicable.

BACKGROUND OF THE INVENTION

(1) Field of the Invention

This invention is directed to aircraft engine storage equipment, where specialized equipment is needed to support the weight of the engine by its mounting points.

(2) Description of Related Art

An engine is the most critical component of an aircraft, and the demands for engine reliability are the highest. An aircraft engine must be transported from a factory to an airplane without damage and utilize engine mounting points to efficiently and safely mount them on an airplane. Engine removal for maintenance is demanding. To this end, specialized engine shipping support stands are used to secure the engine for transport and assist in providing a safe installation.

It is important to note that that specialized shipping support stands are used correctly support the engine, and it must dimensionally fit in trucks and freight airplanes. The air shipping height and weight requirements are smaller than truck shipping requirements but are an important part of transportation stands. U.S. Pat. No. 10,040,579 B1 (Henderson) is an example of an engine shipping support stand. It is a complex and robust stand fully capable of various transportation configurations, as well as the ability to rotate the engine on the transportation support stand. It is also expensive to utilize a shipping support stand in order to meet the demands of long term storage.

Additionally, spare engines need long term storage in maintenance warehouses, and typically weigh up to 7500 lbs. It is important that the engine is held by a suitable storage frame without damage. Engines have different mounting points, and a storage facility will usually house multiple engine types.

In a warehouse environment, it is desirable for an aircraft engine storage frame to:

1. reliably hold the aircraft engine for short or long periods
2. be easily assembled—preferably a welder is not required
3. be capable of anchoring to the ground
4. facilitate an easy transfer between a storage frame and a shipping support stand
5. be capable of attaching to a variety of engine mounts
6. include connections that allow the storage frame/engine to be lifted by an overhead crane or forklift
7. adjustable in height to accommodate different engine sizes
8. be shippable on a skid when purchased
9. be affordable

BRIEF STATEMENT OF THE INVENTION

The embodied invention is a storage frame that supports an aircraft engine with flexible engine mounting and is easily assembled by bolts. It includes feet to anchor the frame to the ground. It has adjustable height legs and is attachable to a variety of engine mount positions. It includes a central lifting tube with lifting connections that allow the frame to be lifted by an overhead crane or forklift. The adjustable legs and adjustable attaching arms provide convenience in transferring the engine on or off a shipping support stand.

DETAILED DESCRIPTION OF THE INVENTION

The embodied storage frame is designed for lifting by use of a forklift or overhead crane. These two options provide an improved storage layout in a warehouse.

Figure 1A:
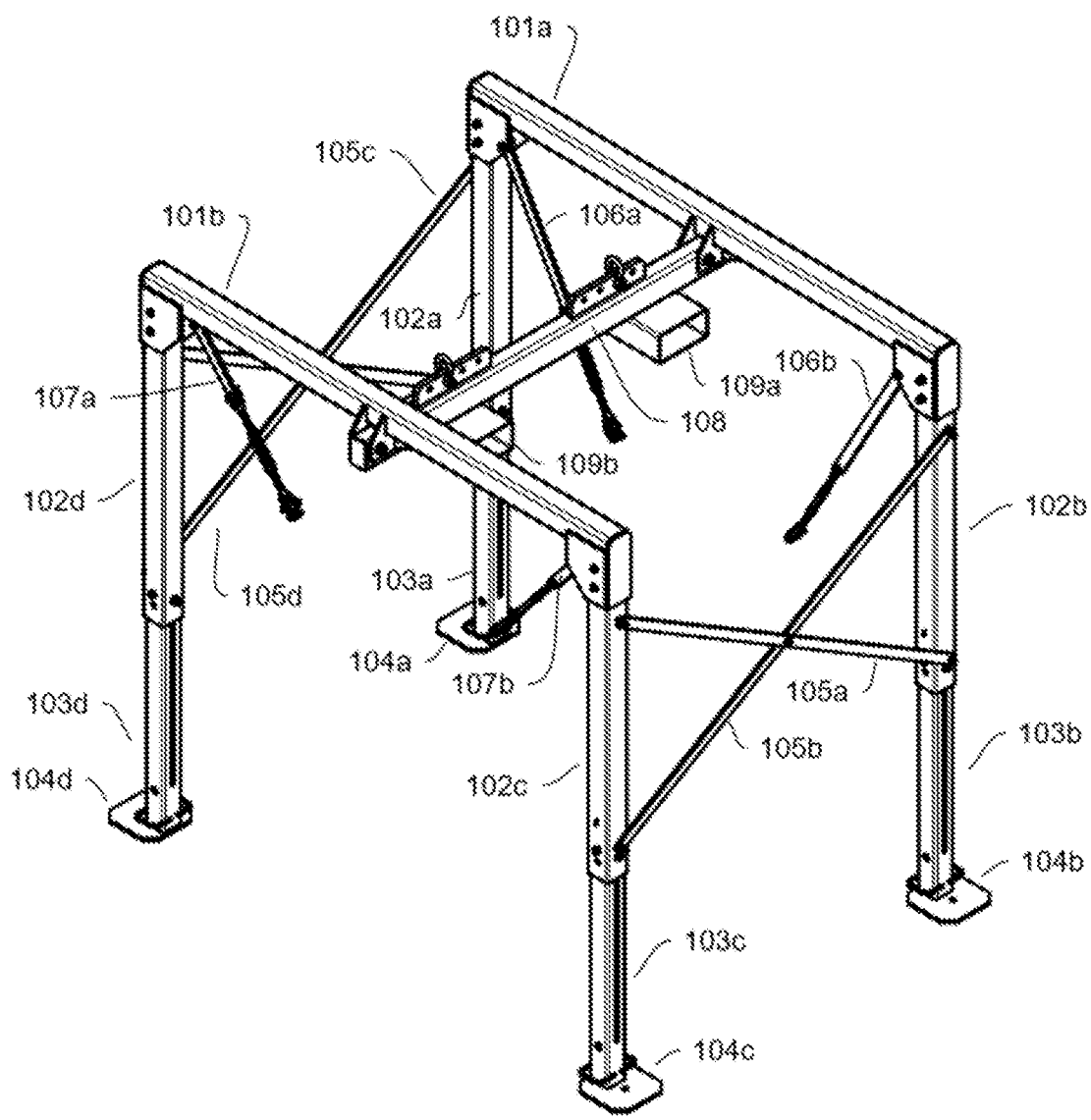
FIGS. 1A-1B shows an isometric view of the aircraft engine storage assembly.

In a main embodiment, the disclosed invention is designed to meet the long term storage need by providing a simple long term storage frame as shown in FIG. 1A. An aft cross support 101*a* and a forward cross support 101*b* are connected to a vertical upper legs 102*a,b,c,d*, and extendable lower legs 103*a,b,c,d* which are connected to a foot 104*a,b,c,d*. The upper legs and the extendable lower legs are designed to withstand an engine weighting 7,500 lbs with reliability and stability. Two forward legs comprise and upper leg 102*c,d* and a lower leg 103*c,d*, and two aft legs also comprise an upper leg 102*a,b* and a lower leg 103*c,d*. The feet are optionally anchored to a concrete floor.

To increase reliability and stiffness, cross braces 105*a,b,c,d* are used to connect the upper legs to prevent racking of the legs.

To support the engine, an aft hanging plates 106*a,b* and a forward hanging plates 107*a,b* are used and connected to cross tube mounting braces 111*a,b,c,d* (see FIG. 1B) which are connected to the vertical upper legs.

For lifting the storage frame, a center lift support 108, or lift tube, is connected between the aft cross tube and forward cross tube. Two forklift tubes 109*a,b* are connected to the center lift tube to provide the capability to use a forklift.

Figure 1B:
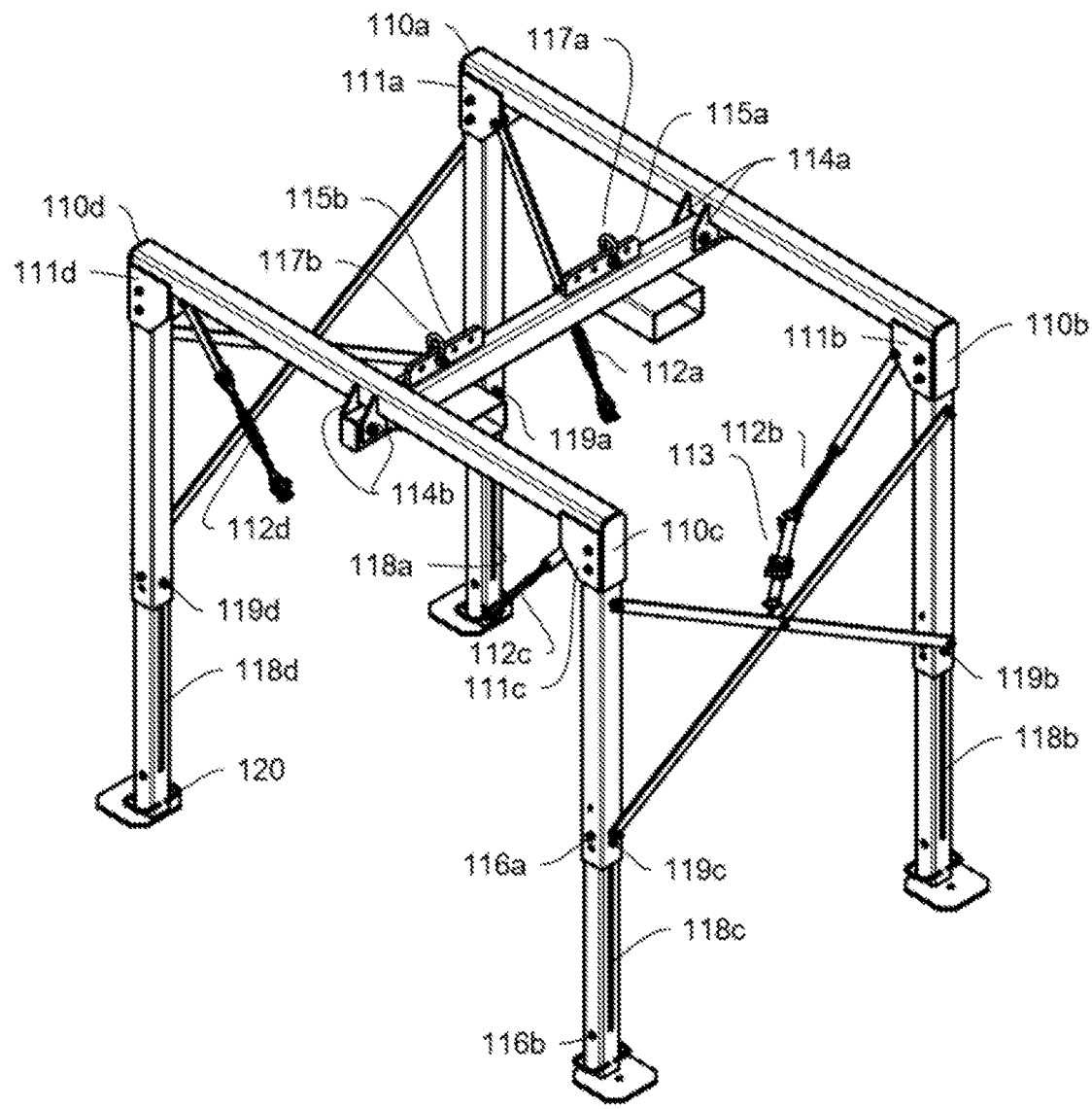

FIG. 1B illustrates additional details of 1A. Cross tube end plates 110*a,b,c,d* are attached to the upper legs. A cross tube mounting brace 111*a,b,c,d* (4 are shown and 4 are hidden) is attached to the aft cross tube and forward cross tube as illustrated, and is used to bolt the aft/forward cross tubes to the upper legs. For improved stiffening, such as needed for earthquake building codes, the cross tube mounting braces may be enlarged and thickened as needed for stronger stiffening.

A pair of adjustable lift turnbuckle 112*a,b* is connected to aft hanging plates 106*a,b* and another pair 112*c,d* are connected to forward hanging plates 106*c,d*. Cross tube connectors 114*a,b* (4 are shown and 4 are hidden) are used to connect the aft and forward cross tubes to the center lift tube.

Additionally, a lifting ratchet strap 113 may be used to connect to the engine and attaching hardware as shown in FIGS. 2A-2D.

A pair of lifting plates 115*a,b* are attached to the center lift tube and include a lifting shackle 117*a,b* on each one.

A leg extension lock pin 116*a* is used to lock the position of the extending legs in the up or down position when not in use by an upper locking hole (not shown) or a lower locking hole 116*b*. Each leg has a similar locking pin/hole but are not labeled.

An extension slot 118*a,b,c,d* on each leg guides the extending legs out of the upper legs. A slot tightening bolt 119*a,b,c,d* locks the lower leg at a desired position. A stop wire (typical example 120) is used to keep the upper leg from sliding down to the foot.

Figure 2A:
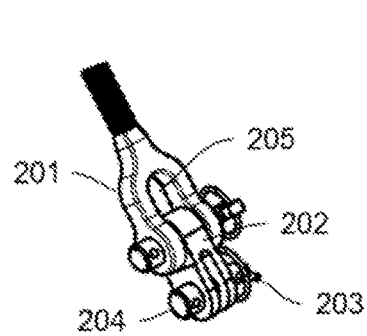
FIGS. 2A-2D show engine connection equipment.

FIGS. 2A-2D show hardware that attaches the engine to the turnbuckle/lifting plate. In FIG. 2A, a Turnbuckle—threaded clevis 201 connects to a lifting clevis 202 which connects to the aircraft engine mounting point. A locking pin 203 and a safety pin 204 secure the lifting clevis to the engine mounting point.

Figure 2B:
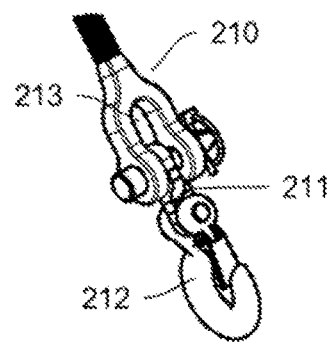

In FIG. 2B, a threaded clevis 210 connects to a two link chain 211 which connects to a clevis hook 212. This design is used for some aircraft lifting points.

Figure 2C:
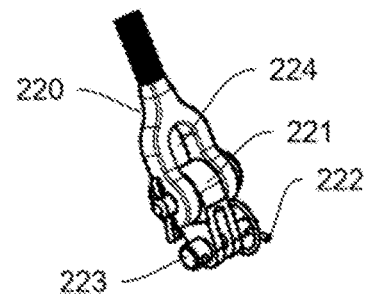

In FIG. 2C, a threaded clevis 220 connects to a rotating clevis 221 which utilizes a locking pin 222 with a safety pin 223 to secure the engine mounting point.

Figure 2D:
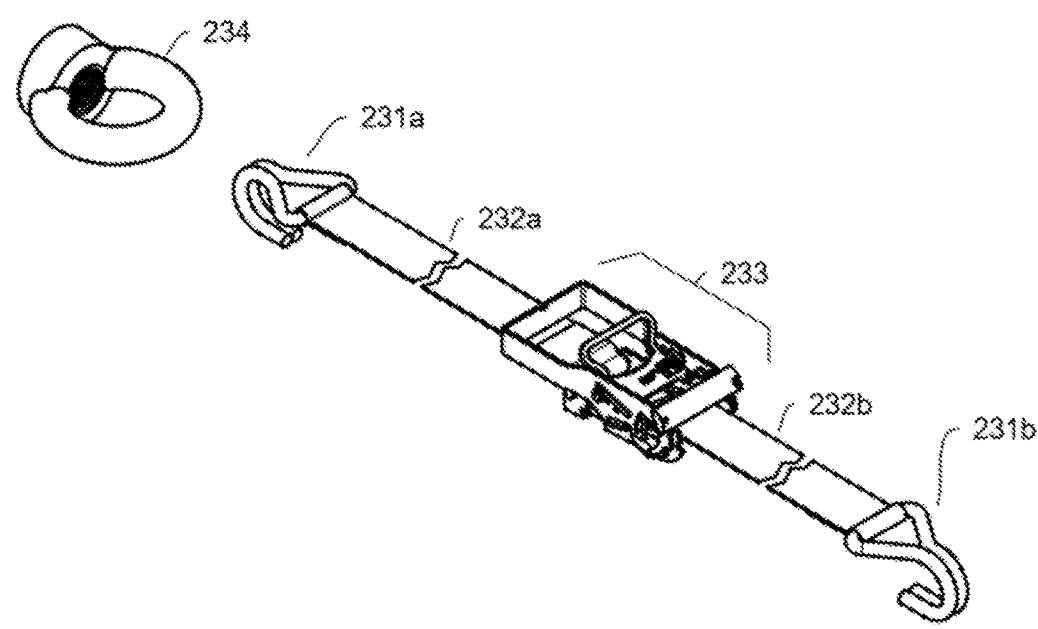

In FIG. 2D, a lifting (ratcheting 233) strap shown. It comprises end hooks 231*a,b* which connects to straps 232*a,b* which are connected to a hand ratchet that is used to tighten the straps. One end hook inserts into a lifting eye 234 which is attached to the cross bracing (see FIG. 4).

Alternately, hook openings 205, 213, 224 in FIGS. 2A-2C are used by the lifting strap hook.

Figure 3:
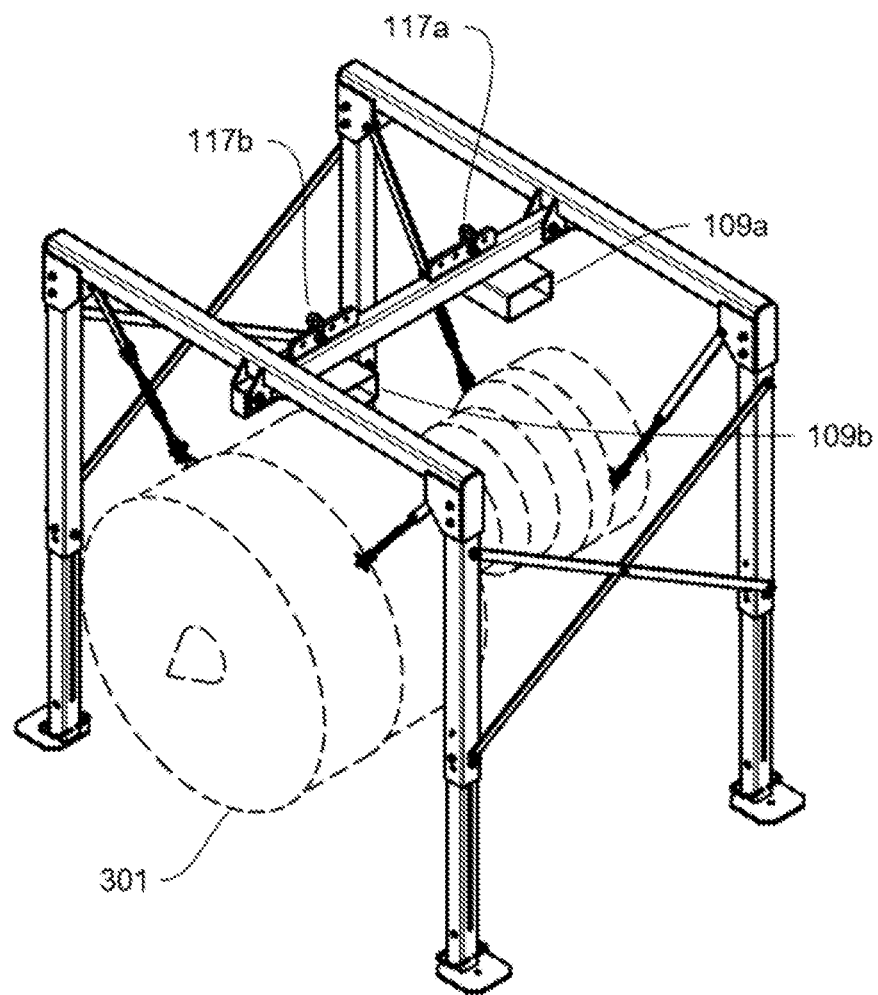
FIG. 3 shows how a typical engine is hung on the aircraft engine storage frame.

FIG. 3 shows how the aircraft engine 301 would typically be positioned when mounted in the storage frame along with lifting shackles 117*a,b* and forklift tubes 109*a,b*.

Figure 4:
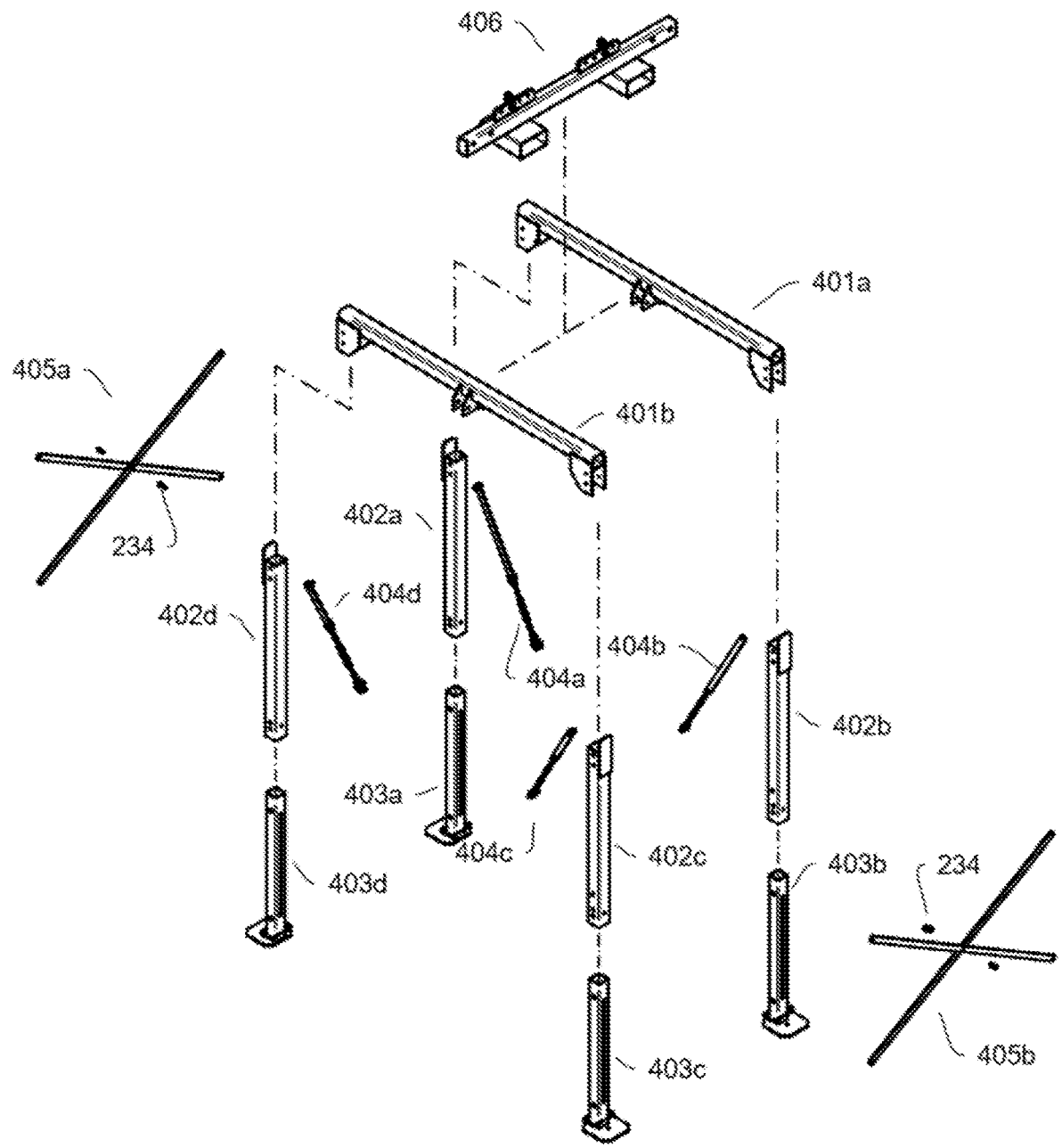
FIG. 4 shows an exploded view of the storage frame sub-assemblies that are designed for compact shipping.

FIG. 4 shows an exploded view of the storage frame sub-assemblies:

401*a,b* Aft/Forward Cross Tube Assembly
402*a,b,c,d* Upper Leg Assembly
403*a,b,c,d* Lower Leg Assembly
404*a,b,c,d* Attaching Arm Assembly
405*a,b* Cross Brace Assembly
406 Center Lift Tube Assembly By hanging the engine between vertical legs, the weight of the engine helps prevent the vertical legs from racking perpendicular to the engine axis. The engine aids in self-centering between legs.

The entire frame and engine as shown in FIG. 3 are liftable by connecting an overhead crane to the shackles 117*a,b* with a hoisting sling/wire. Alternately, a large forklift with a suitable counter weight design, is used lift the entire frame/engine by forklift tubes 109*a,b*. The assembled storage frame weighs about 1,800 lbs to two significant digits.

Figure 5:
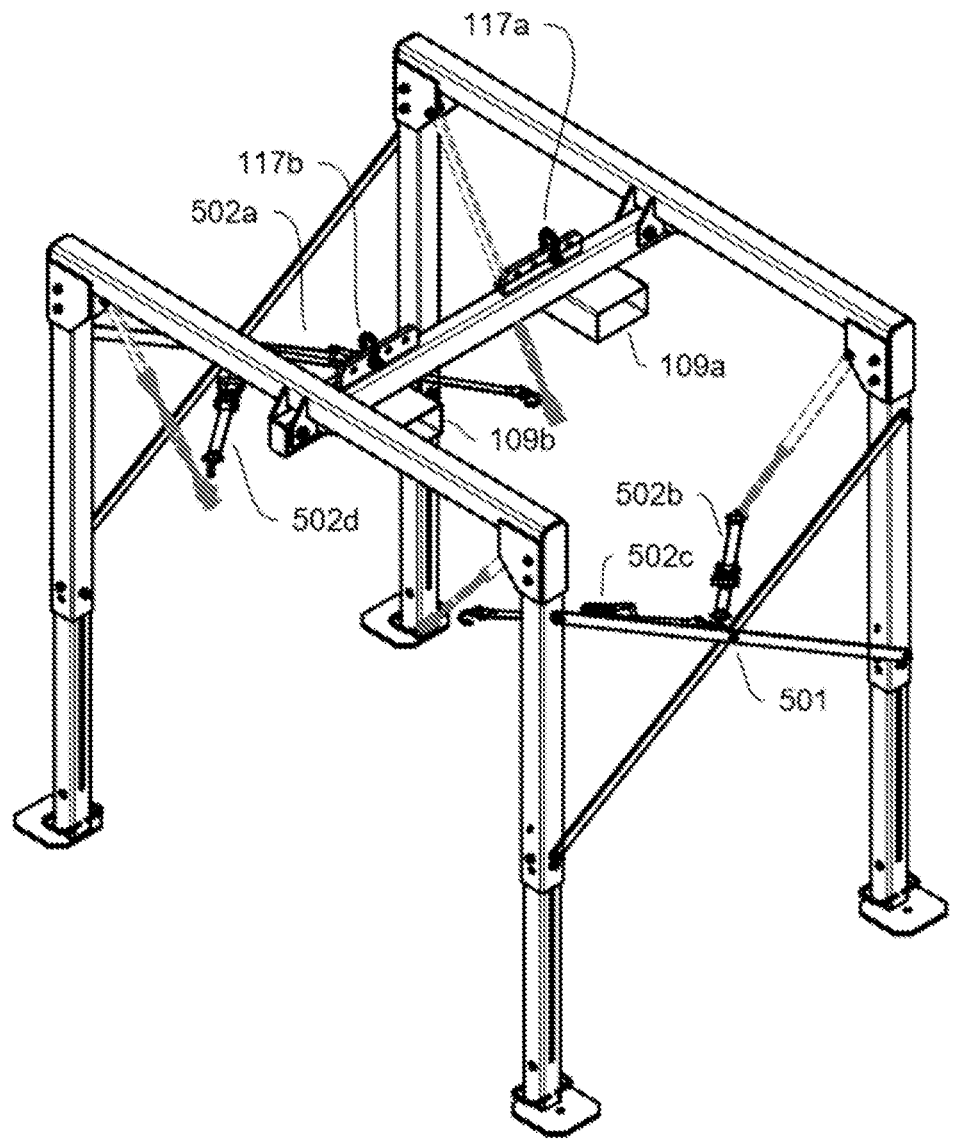
FIG. 5 shows how the lifting straps are attached directly to the cross bracing.

In FIG. 5 the lifting strap assemblies 502*a,b,c,d* already mentioned are connected to an eye bolt 501 on the cross brace on either side. The lifting points 117*a,b* 109*a,b* are used to lift the storage frame as already mentioned.

The design reliably holds the engine by securing the engine directly to the support legs which improves the stress design and avoids stressing un-necessary connecting elements.

The design is flexible and efficiently uses many common parts, and only the length of the aft and forward cross tubes, or the length of the center lifting tube needs to be changed for various engines. The height of the frame can be varied from 78-173 inches tall by adjusting the lower legs. Uneven ground can be compensated by suitable slight variations in leg length. The turnbuckle-hanging plates allow the lifting lengths to be varied, or for longer reaches, lifting straps can be used.

As shown in the FIG. 4 exploded view, the entire storage frame is designed in pre-assembled parts that are bolted together. Preferably, a welder is not required for assembly. The feet under each leg can be anchored to a concrete floor by using a bolt. It is readily apparent that the storage frame comprises a number of sub assemblies, that will take up little volume for shipping when purchased.

To transfer the engine to the storage frame, the engine is brought into a warehouse on a shipping stand. An overhead crane/forklift lifts the storage frame above the engine, and slowly lowers it to the ground around the engine and the width of the shipping stand. The legs are then extended and locked by a bolt/pin to a convenient working height. Then the engine mounting points are transferred one at a time, and the lifting turnbuckles are used to switch the weight of the engine to the storage frame. By adjusting the turnbuckle, and carefully watching for slight upward movements in the engine, a warehouse person can observe that the weight has transferred. The storage frame/engine are then raised by the crane/forklift and moved to the storage location. This allows the shipping stand to be moved.

Although structural tubes are a preferred embodiment for various structural components, such as legs and horizontal structures, other structural types could equally be employed. The term 'support' would equally encompass both structural tubes and other structural types.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. An aircraft engine storage frame comprising:
    A) two forward adjustable legs connected by a horizontally oriented first upper cross support,
    B) two aft adjustable legs connected by a horizontally oriented second upper cross support,
    C) a horizontally oriented lift support connected to a center of said first upper cross support and additionally connected to a center of said second upper cross support,
    D) said lift support having a plurality of crane lift connections and a plurality of forklift connections,
    E) a first cross brace support between said forward adjustable legs,
    F) a second cross brace support between said aft adjustable legs, and
    G) an engine attaching arm connected to each said forward adjustable leg and said aft adjustable leg.

2. The aircraft engine storage frame according to claim 1, whereby said aircraft engine storage frame is capable of holding an aircraft engine weighing 7,500 lbs or less by a plurality of engine mounting points.

3. The aircraft engine storage frame according to claim 1, wherein

A) said first upper cross support incorporates end connections and a center connection,
B) said second upper cross support incorporates end connections and a center connection, and
C) said forward adjustable legs and said aft adjustable legs incorporate upper end connections.

4. The aircraft engine storage frame according to claim 1, wherein each said engine attaching arm further comprises:
A) a hanging plate connected to a threaded turnbuckle,
B) said threaded turnbuckle connected to a threaded clevis,
C) said threaded clevis rotatably connected to:
   a) a lifting clevis with a locking pin, or
   b) a lifting hook.

5. The aircraft engine storage frame according to claim 1, wherein at least one lifting strap is connected to said first cross brace support or said second cross brace support.

6. A method of switching support for an aircraft engine from a transportation stand to a storage frame comprising:
A) providing an aircraft engine storage frame further comprising:
   a) two forward adjustable legs connected by a horizontally oriented first upper cross support,
   b) two aft adjustable legs connected by a horizontally oriented second upper cross support,
   c) a horizontally oriented lift support connected to a center of said first upper cross support and additionally connected to a center of said second upper cross support,
   d) said lift support having a plurality of crane lift connections and two forklift connections,
   e) a first cross brace support between said forward adjustable legs,
   f) a second cross brace support between said aft adjustable legs, and
   g) an engine attaching arm connected to each said forward adjustable leg and said aft adjustable leg,
B) lifting said storage frame and positioning said storage frame above said aircraft engine that is mounted on said transportation stand,
C) lowering said storage frame to the ground and adjusting all said adjustable leg length relative to a plurality of engine mount positions, and
D) separately utilizing each of a plurality of aircraft mount connectors to transfer support of said aircraft engine from said transportation stand to each said aircraft engine storage frame.

7. The method according to claim 6,
whereby said aircraft engine storage frame is capable of holding said aircraft engine weighing 7,500 lbs. or less by a plurality of engine mounting points.

8. The method according to claim 6, wherein
A) said first upper cross support incorporates end connections and a center connection,
B) said second upper cross support incorporates end connections and a center connection, and
C) said forward adjustable legs and said aft adjustable legs incorporate upper end connections.

9. The method according to claim 6, wherein each said engine attaching arm further comprises:
A) a hanging plate connected to a threaded turnbuckle,
B) said threaded turnbuckle connected to a threaded clevis,
C) said threaded clevis rotatably connected to:
   a) a lifting clevis with a locking pin, or
   b) a lifting hook.

10. The method according to claim 6, wherein at least one lifting strap is connected to said first cross brace support or said second cross brace support.

* * * * *